Figure 1:
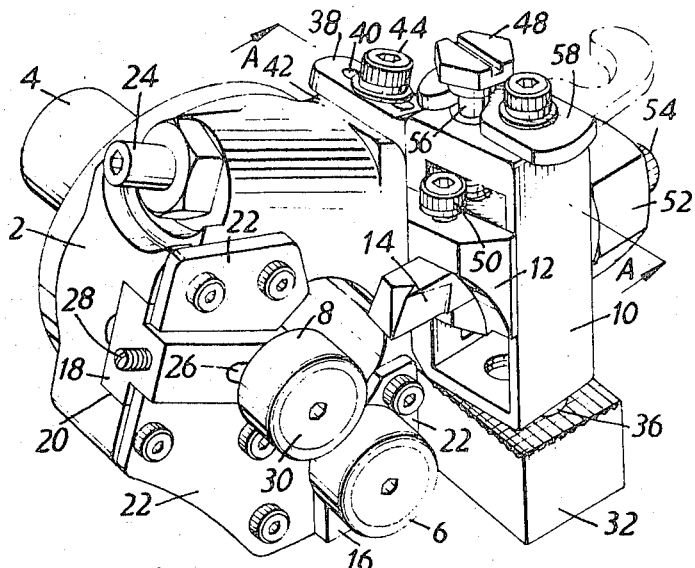

United States Patent [19]

Saunders

[11] 3,765,279

[45] Oct. 16, 1973

[54] ROLLER BOX TOOLS

[75] Inventor: Albert Saunders, Peacehaven, England

[73] Assignee: The Saunders Roller Box Tool Company Limited, Sussex, England

[22] Filed: Oct. 17, 1972

[21] Appl. No.: 298,264

[52] U.S. Cl. .................................................. 82/35
[51] Int. Cl. ............................................ B23b 29/00
[58] Field of Search ......................................... 82/35

[56] References Cited
UNITED STATES PATENTS
3,000,247   9/1961   Saunders ................................. 82/35
2,389,853   11/1945   Harris ..................................... 82/35

Primary Examiner—Harrison L. Hinson
Attorney—Alvin Browdy et al.

[57] ABSTRACT

A roller box tool, for a lathe or like machine tool, wherein the tool mounting means include a toolpost secured by clamping means passing through an axially elongated slot to a platform extending axially from the body of the box tool, and in which the toolpost is further secured by means of an arm which is secured to the body of the box by means allowing location of the toolpost in any clamped position thereof relative to the platform whereby any tendency of the toolpost to be displaced under pressure is reduced without unduly adversely affecting the overall balance of the box tool.

6 Claims, 2 Drawing Figures

PATENTED OCT 16 1973 3,765,279

ROLLER BOX TOOLS

This invention relates to roller box tools.

Roller box tools are devices for providing support to a rotating workpiece during a cutting operation and in the immediate vicinity of the cutting tool. They comprise essentially a box body having means such as a cylindrical shank for attachment to e.g., the turret or tailstock of a lathe or similar machine tool, circumferentially spaced rollers for supporting a rotating workpiece during the cutting operation and means for holding the cutting tool in an operational position facing the rollers. The rollers, of which there are normally two, are generally arranged with their axes parallel to the axis of the workpiece and the location of their axes is generally radially adjustable with respect to the axis of the box tool so that they may accommodate workpieces of varying outside diameters.

This invention is particularly concerned with roller box tools of the kind in which the tool holding means include a toolpost which is securable at its base to a platform formed on and extending axially of the roller box, the toolpost extending upwards from the platform to provide a mounting for a tool extending towards the rollers and the toolpost being securable to the platform by clamping means passing through an axially elongated slot whereby its location relative to the box body is axially adjustable. In such roller box tools, the tool is conveniently held in a toolholder which is mounted on the toolpost and arranged to be adjustable along the length of the toolpost.

Although such roller box tools have generally proved satisfactory using manual feed or for light cuts, it has been found that under power feed or when making heavy cuts the toolpost tends to be displaced from its clamped position on the platform thereby causing damage to the tool or the machine or both.

One method that presents itself for obviating this shortcoming is to provide a second clamping bolt passing through the slot to clamp the toolpost base to the platform. However this would necessitate extending the length of the slot if the same extent of adjustment were to be retained and such extension would necessitate corresponding extension of the platform or the toolpost base (depending on which has the slot) in the axial direction away from the body of the roller box. Such an increase in the overall axial length of the tool would not be desirable since it would adversely affect the balance of the tool and therefore increase any tendency to vibrate during machining operations.

An alternative solution is to provide a further slot in the platform or base of the toolpost parallel to the first slot and a second clamping bolt passing through this slot but this solution would also adversely affect the balance of the tool and increase any tendency to vibrate during machining operations.

In accordance with the present invention the problem is resolved by providing the toolpost with an arm which overlies the roller box body and providing means for securing said arm to the roller box body in any clamped position of the toolpost relative to the platform.

Preferably the arm has a flat surface facing the roller box body and the roller box body is provided with a flat platform where the arm overlies the body for receiving the flat surface of the arm.

The means for clamping the arm to the body may suitably comprise a second elongated slot, said second slot being provided in the arm and extending parallel to the first elongated slot, and clamping means adapted to pass through the second slot and engage with the roller box body.

The first elongated slot is preferably provided in the platform to which the toolpost base is securable although it can also be provided in the base of the toolpost.

As the increase in mass provided by the additional anchorage is concentrated in the vicinity of the body of the box, any resultant imbalance is only small and yet the rapidity with which the location of the toolpost can be adjusted is hardly affected and the overall compactness of the tool is virtually unchanged.

Furthermore by providing for the level at which the arm overlies the box body to be different from the level of the platform to which the base of the toolpost is securable, an improvement may be obtained in not only the anchorage of the toolpost but also its torsional rigidity. Preferably, the level at which the arm overlies the roller box body lies on the other side of the tool mounting on the toolpost from the level of the platform to which the toolpost base is securable.

Whereas this arrangement allows rapid adjustment of a cutting tool mounted in the toolpost along the axis of the workpiece and tight anchorage of the toolpost in any desired position, it is also generally desirable for the cutting tool to be adjustable in two mutually perpendicular directions in the plane normal to the axis of the workpiece. For one such adjustment, the tool carrying means suitably comprise a tool carrier arranged to be slidable on the toolpost towards and away from the platform on which the toolpost is mounted and having a tapped bore or channel, and an adjusting screw located on the toolpost for free rotation about its axis only and adapted to cooperate with the tapped bore or channel in the tool carrier whereby rotation of the screw moves the carrier along the toolpost. For the other adjustment, the tool may be adjustable in the carrier in the direction normal both to the direction of movement of the carrier along the toolpost and to the direction of movement of the toolpost on the first platform.

For a variety of reasons, e.g., for measuring the depth of cut or for removing swarf, it is often necessary to lift the tool away from the workpiece temporarily during a cutting operation. Use of the adjusting screw for this purpose is tedious and unless some accurate gauge is provided it is very difficult to relocate the tool exactly.

In accordance with a preferred embodiment of the invention, means are provided which allow rapid lifting of the tool and accurate subsequent relocation without the need for expensive measurement equipment. In this embodiment, locking means are provided which in one position lock the axial location of said adjusting screw relative to the toolpost while permitting its rotation and in another position free the adjusting screw for sliding axial movement relative to the toolpost. Suitably, the locking means comprise a groove in the adjusting screw and a latch adapted to engage the groove in the locked position and mounted for pivotal movement on the head of the toolpost into and out of engagement with the groove.

By this means, the tool can be rapidly and easily lifted away from the work by releasing the locking means and lifting the adjusting screw and, because of the dependable and rigid anchorages of the toolpost to the platform and to the roller box body, accurate relocation of the tool in its cutting position is effected simply by dropping the screw back until the locking means can be re-engaged.

Figure 2:
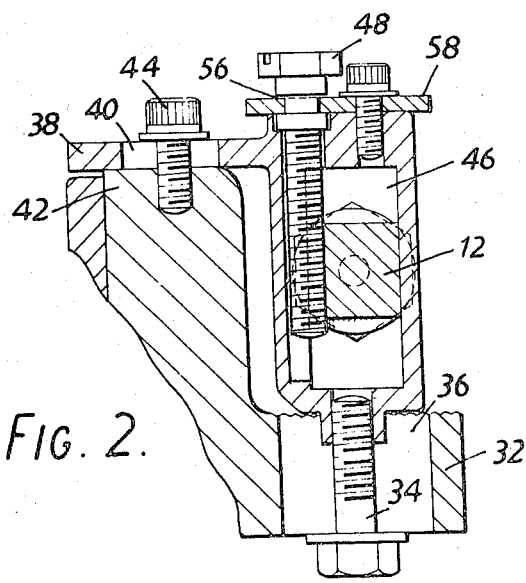

The invention is now illustrated with reference to one embodiment thereof and with the aid of the accompanying drawings in which :

FIG. 1 is a perspective view of a roller box tool according to the invention and FIG. 2 is a vertical cross section through the toolpost along the line A—A.

The roller box tool comprises a body 2 to the rear face of which is attached a shank 4 for fixing the device to the turret or tailstock of the lathe or other machine tool. Preferably the shank is bored as illustrated to allow passage therethrough of the machined material when long lengths are to be machined. On the opposite (front) face of the tool are provided a pair of rollers 6, 8 and a toolpost 10 carrying a tool carrier 12 in which is mounted a cutting tool 14.

Each of the rollers is attached to a slide 16, 18 which is slidably located in a radially disposed channel 20 in the face of the box body, the slides being retained in the channels by plates 22. The slides are arranged for synchronous radial adjustment by any suitable means, not shown. For preference, each slide has a corresponding rack meshing with a pinion located within the body of the box tool and the pinions all mesh with a sun wheel movement of which is effected by rotation of a meshing wormwheel which is rotated by shaft 24 e.g., by means of an Allen key.

The spindle of roller 6 is mounted rigidly on its slide 16 but the spindle of roller 4 is a sliding fit in elongated slot 26 in slide 18 which is longitudially bored and tapped to receive a pilot screw 28 on which is fitted a coil spring (not shown) and the inner end of which bears on the roller spindle. Roller 8 is mounted on hub 30 rotation of which in a clockwise sense locks the spindle at any desired position along the slot.

This arrangement, the operation of which is described hereinafter, allows automatic compensation for any eccentricity between the head and tailstocks of the machine and is preferred for its simplicity, robust construction and compactness.

The toolpost 10 is located on a platform 32 which extends axially from the body of the box tool opposite the rollers. The post is clamped to the platform by means of a bolt 34 which passes through an elongated slot 36 in the platform 32 and into a tapped bore in the base of the toolpost.

In accordance with the invention, the toolpost is also provided with an arm 38 having an elongated slot 40 and extending over a second platform 42 which is formed on the body of the roller box. The arm is clamped to this second platform 42, which is at a different level to the first platform, by a clamping screw 44 which passes through the slot. The first platform is knurled to further assist anchorage of the toolpost under load.

The toolpost has a vertical slideway 46 one side wall of which is provided along its length with an arcuate groove. Tool carrier 12 is a sliding fit in the slideway 46 and one side of it is provided with an arcuate channel portion which cooperates with the arcuate groove in the wall of the slideway to receive an adjusting screw 48 the head of which projects through a clearance bore in the top of the toolpost. The channel in the slide is screw threaded to mate with the thread of the adjusting screw, whereby rotation of the screw provides for accurate adjustment of the vertical location of the tool carrier 12 in the slideway. The tool 14 is held firm in a square slot in tool carrier 12 by lock screw 50 and the rear end of the tool carrier is threaded to receive a back up nut 52 which locks the tool carrier against the toolpost. The cap of the nut is bored and tapped to receive adjusting screw 54 for adjusting the fore and aft location of the tool relative to the toolpost.

The adjusting screw 48 has a circumferential groove 56 the bottom edge of which is flush with the top of the toolpost. A latch 58 is pivotally attached to the head of the toolpost for movement into and out of locking engagement with the groove 56 and in the locked position locates the screw axially in the toolpost but permits rotation.

In operation, the roller box tool is mounted on the lathe or similar machine by sliding the shank 4 into the turret or tailstock and locking it. With the hub 30 of roller 8 loosened andthe pilot screw 28 slackened off to allow free movement of the spindle of roller 8 along slot 26 of the slide 18, the rollers are adjusted radially by rotation of shaft 24 until the bottom roller 6 touches the workpiece. The hub 30 of top roller 8 is then tightened up to lock the spindle of the roller in position and pilot screw 28 is screwed in until it bears on the spindle to prevent any radially outward movement under load. Any eccentricity between head and tailstock in the machine is thus taken up automatically.

The tool 14 is fitted into tool carrier 12 and the toolpost 10 with the tool carrier on it is located in the desired position on the platform 32 and locked firmly in position by tightening bolt 34 and clamping screw 44.

With locking screw 50 and back-up nut 52 both slackened off, and latch 58 released from engagement with the groove 56, the cutting tool 14 is backed up by rotation of adjusting screw 54 to be on top centre of the stock and locking screw 50 is tightened. Tool carrier 12 is then raised by lifting the adjusting screw 48 and then allowed to slide back until the tool engages the workpiece. The adjusting screw is then rotated until the groove 56 can be engaged by latch 58 and the tool is then locked in position for the machining operation by tightening back-up nut 52 with latch 58 reengaged with the groove 56.

By means of the invention, very accurate location of the tool can be achieved for cutting to fine tolerances and undesired movement of the tool under load such as during powered feeding or heavy cutting is substantially eliminated. This accuracy and reliability permits the further desirable feature whereby during a machining operation the tool can be released and raised from its machining position to permit examination of or allow access to the workpiece, e.g., for cleaning or measurement, and subsequently reset rapidly and exactly to its original position merely by releasing the latch 58 from the groove 56 and lifting the adjusting screw 48 and subsequently allowing the adjusting screw to slide back into the toolpost until the groove is in its correct location for re-engagement by the latch.

I claim:

1. A roller box tool in which the tool holding means include a toolpost which is securable at its base to a platform formed on and extending axially of the roller box body, the toolpost extending upwards from the platform to provide a mounting for a tool extending towards the rollers, and the toolpost being securable to the platform by clamping means passing through an axially elongated slot for clamping said base to said platform, wherein the toolpost is provided with an arm which overlies the roller box body and further clamping means are afforded to secure the arm to the roller box body in any clamped position of the toolpost relative to the platform.

2. A roller box tool as claimed in claim 1 in which the arm has a flat surface facing the roller box body and the roller box body is provided with a flat platform where the arm overlies the body for receiving the flat surface of the arm.

3. A roller box tool as claimed in claim 1 in which the arm overlies the roller box body at a different level from that of the platform to which the toolpost base is securable.

4. A roller box tool as claimed in claim 3 in which the level at which the arm overlies the roller box body lies on the other side of the tool mounting on the toolpost from the level of the platform to which the toolpost base is securable.

5. A roller box tool as claimed in claim 1 in which the elongated slot is provided in the platform to which the base of the toolpost is securable and the means for clamping the arm to the roller box body comprise a second elongated slot, said second slot being provided in said arm and extending parallel to said first elongated slot, and clamping means passing through said second slot.

6. A roller box tool as claimed in claim 1 in which the tool carrying means further comprise a tool carrier arranged to be slidable on the toolpost towards and away from the first platform and having a tapped bore or channel, an adjusting screw located on the toolpost for free rotation about its axis and adapted to cooperate with said tapped bore or channel whereby rotation of the screw moves the tool carrier along the toolpost, and locking means which in one position lock the axial location of said adjusting screw relative to the toolpost while permitting its rotation and in another position free the adjusting screw for sliding axial movement relative to the toolpost.

* * * * *